United States Patent
Graham et al.

[15] 3,642,535
[45] Feb. 15, 1972

[54] TABLETTING SUGAR, METHOD OF PREPARING COMPOSITIONS CONTAINING SAME

[72] Inventors: Charles P. Graham, Hicksville; Louis Fonti, Jr.; Arnold M. Martinez, both of Brooklyn, all of N.Y.

[73] Assignee: American Sugar Company, New York, N.Y.

[22] Filed: Jan. 21, 1970

[21] Appl. No.: 4,593

[52] U.S. Cl. ..................127/29, 99/134 R, 264/122, 424/154, 424/280, 424/358, 424/361
[51] Int. Cl. ...................................................C13f 3/00
[58] Field of Search ...................127/30, 58, 61, 29

[56] References Cited

UNITED STATES PATENTS

| | | | |
|---|---|---|---|
| 2,965,520 | 12/1960 | Snyder | 127/29 X |
| 3,085,914 | 4/1963 | Wadsworth | 127/58 X |
| 3,365,331 | 1/1968 | Miller | 127/61 X |

OTHER PUBLICATIONS

"Hackh's Chemical Dictionary", Julius Grant, ed., 178, McGraw-Hill Book Co., New York, 1969.
A. Lachmann, Food Engineering, 140, 143, 145, May 1966.

*Primary Examiner*—Morris O. Wolk
*Assistant Examiner*—Sidney Marantz
*Attorney*—Robert S. Dunham, P. E. Henninger, Lester W. Clark, Gerald W. Griffin, Thomas F. Moran, Howard J. Churchill, R. Bradlee Boal, Christopher C. Dunham and Robert Scobey

[57] ABSTRACT

A tabletting sugar made up of agglomerates of fondant-size sucrose crystals having a crystal size in the range 3–50 microns and containing sucrose and from about 0.5 to about 7.5 percent by weight malto-dextrin based on the sucrose content is prepared by concentrating a sugar syrup containing sucrose and malto-dextrin, the sucrose and malto-dextrin being present in the above-indicated proportions. The concentration of the syrup is carried out to a temperature in the range from about 120° to about 130° C. to a solids content in the range about 91–97 percent by weight solids. The resulting concentrated sugar syrup is then subjected to impact beating within a crystallizing zone while at the same time a gas, such as air, flows through said crystallizing zone to prevent an increase in the temperature of said syrup and any sugar product resulting therefrom and to carry off water vapor produced within said crystallizing zone. Within the crystallizing zone the gas flowing therethrough, the syrup and the resulting sugar product are in intimate admixture. There is then recovered from the crystallizing zone a granular sugar product comprising agglomerates of fondant-size sucrose crystals and having less than about 2.5–3.0 percent by weight moisture. The granular sugar product is then dried to a moisture content below about 1 percent by weight, cooled, milled and screened to a desired size range so as to produce a useful tabletting sugar. Tabletted sugar-containing products comprising a major amount of a sugar product produced as described hereinabove can be manufactured.

3 Claims, 2 Drawing Figures

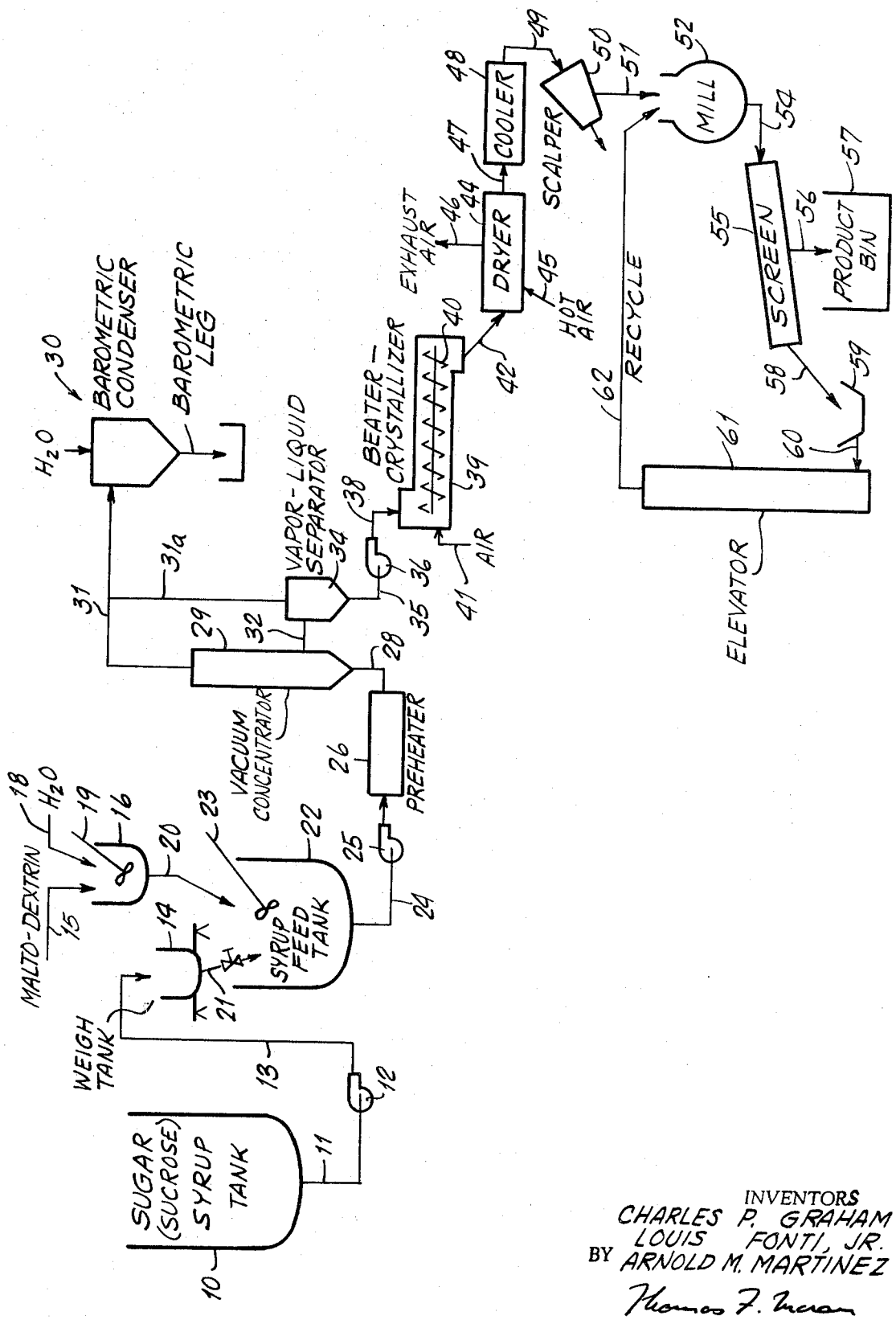

TABLETTING SUGAR, METHOD OF PREPARING COMPOSITIONS CONTAINING SAME

This invention relates to tabletting sugar compositions, methods of preparing the same and compositions containing the same.

Tabletting sugars are useful in the production of confectionary products and drug-containing products. In the preparation of such products a flavoring material or a drug or medicament is uniformly admixed with the tabletting sugar and the resulting admixture directly compacted into a tablet of desired shape. A tabletting sugar should yield a stable, preferably hard, substantially nonhygroscopic tablet and should be substantially inert with respect to the additives, particularly a drug component or additive incorporated therein. Additionally, a tabletting sugar should be a free-flowing sugar composition exhibiting substantially no sticking to the die during compaction and should be nonhygroscopic and capable of remaining free-flowing even while in contact with air over a reasonable period of time.

Various techniques for the preparation of a tabletting sugar are known and various additives have been employed in the manufacture or makeup of a tabletting sugar composition. For the most part, however, such techniques and tabletting sugar compositions and additives have not been completely satisfactory.

It is an object of this invention to provide an improved tabletting sugar, method of preparing the same and compositions containing the same.

It is another object of this invention to prepare a superior direct compaction tabletting sugar.

How these and other objects of this invention are achieved will become apparent in the light of the accompanying disclosure made with reference to the accompanying drawing which schematically illustrates a process flow scheme for the manufacture of a tabletting sugar in accordance with this invention.

In accordance with this invention a superior tabletting sugar is provided by a sugar-containing composition consisting essentially of aggregates or agglomerates of fondant-size sucrose crystals, such as sucrose crystals having a crystal size in the range 3–50 microns, together with a minor amount of malto-dextrin, such as an amount in the range from about 0.5 to about 7.5 percent by weight based on the sucrose content of the tabletting sugar composition.

A tabletting sugar composition is prepared in accordance with this invention by forming a syrup consisting essentially of water, sucrose and malto-dextrin, the amount of malto-dextrin being present in a minor amount, specifically an amount in the range 0.5 to 7.5 percent by weight based on the sucrose component dissolved in the syrup. Preferably, the amount of water in the syrup should yield a syrup having a solids content made up of sucrose and malto-dextrin in the range 60–75 percent by weight solids, such as about 67 percent by weight solids.

The syrup is concentrated to a temperature in the range from about 120° to about 130° C., preferably not higher than 130° C., and to a solids content in the range 91–97 percent by weight. To avoid high temperatures during the concentration operation the concentration is carried out under reduced pressure, such as a pressure substantially below atmospheric pressure, e.g., a pressure in the range 5–500 mm. Hg absolute. The concentration operation is carried out under conditions to avoid crystallization of sucrose from the syrup undergoing concentration. The malto-dextrin present with the sucrose in the syrup undergoing concentration acts as a crystallization inhibitor during concentration.

When the syrup has been concentrated to a desired solids content, i.e., a solids content in the range 91–97 percent the solids (total sucrose and malto-dextrin), a stream of the hot concentrated syrup is introduced into the crystallization zone wherein it is subjected to impact heating. While the concentrated syrup is undergoing impact beating within the crystallization zone a gas is flowing therethrough so as to prevent an increase in the temperature of the syrup and the crystallized sugar product resulting therefrom and to carry off water vapor produced within the crystallization zone due to the crystallization of the sugar from the syrup. Within the crystallization zone the gas, such as air, which is admitted or forced through the crystallization zone initially at ambient or room temperature and the resulting crystallized sugar product are in intimate admixture.

There is formed within the crystallization zone due to the shock chilling of the concentrated sugar syrup by the impact beating aggregates or agglomerates of fondant-size sucrose crystals size in the range 3–50 microns. These agglomerates of fondant-size sucrose crystals are intimately and homogeneously admixed with the malto-dextrin.

As the gas, such as air, flows through the crystallization zone it carries with it any moisture released within the crystallization zone due to the crystallization of the sucrose from the concentrated sugar syrup. There is recovered from the crystallization zone a granular sugar product made up of agglomerates of fondant-size sucrose crystals and having less than about 2.5–3.0 percent by weight moisture, usually less than about 2.0 percent by weight moisture.

The resulting granular sugar product recovered from the crystallization zone is then dried to a moisture content below about 1 percent by weight, such as below about 0.5 percent by weight, cooled and screened to a desired size range so as to produce a useful tabletting sugar. A useful size range would be a sugar product having a size such that 100 percent of the sugar product passes through a 35 mesh Tyler screen.

The tabletting sugar produced as described hereinabove comprising less than 10 percent by weight malto-dextrin, e.g., about 1–3 percent malto-dextrin based on the sucrose content, and containing less than 1 percent by weight moisture, e.g., about 0.1–0.5 percent by weight moisture, is capable of yielding, when tabletted, sugar-containing tablets which are structurally stable and substantially nonhygroscopic. Sugar-containing tablets containing a substantial amount of nonsugar components or additives, not including the malto-dextrin content of the tabletting sugar, such as tabletted sugar compositions or sugar-containing tablets containing up to about 30 percent by weight of a nonsugar (not sucrose and malto-dextrin) additive, can be manufactured.

In the practice of this invention the other sugar component in the tabletting sugar in addition to sucrose is described as malto-dextrin. Malto-dextrins are also known as hydrolyzed cereal solids and such materials are commercially prepared by the acid or enzymic treatment of starch. A hydrolyzed cereal solid or malto-dextrin useful in the practice of this invention is sold under the trade name Mor-Rex by Corn Products Co. and another suitable hydrolyzed cereal solid or malto-dextrin is sold under the trade name Maltrin by Grain Processing Corp.

The terms hydrolyzed cereal solids and malto-dextrins are used to identify and define certain special starch conversion products. The amount of dextrose formed during starch conversion determines the class or identification of the products so formed. If the dextrose equivalent in the starch conversion product has a value above about 19, then the resulting starch conversion products is called corn syrup solids. When, however, the dextrose content of the starch conversion product is a very small amount, almost a trace, then the starch conversion product is called a dextrin. Those starch conversion products having a dextrose equivalent (D.E.) value below about 19, i.e., intermediate a D.E. value of 19 and trace amount or minimal D.E value, are known as hydrolyzed cereal solids or malto-dextrin and are the materials, i.e., the malto-dextrin, which are employed in the practice of this invention for the preparation of the subject tabletting sugar compositions.

The malto-dextrin or hydrolyzed cereal solids employed in the preparation of tabletting sugar compositions described herein are particularly useful since such materials act as crystallization inhibitors during the concentration operation and are low enough in reducing sugar content to minimize the degradation of any active additive or component or ingredient which may be admixed with the tabletting sugar for the manufacture of a desired tabletted sugar composition. Additionally, these materials provide a sweet base and serve to provide a pleasant tasting tablet. The properties of suitable hydrolyzed cereal solids or malto-dextrins are set forth in accompanying Table No. 1.

TABLE NO. 1

| Property | Malto-Dextrin 1 | Malto-Dextrin 2 |
|---|---|---|
| Moisture % | 5 max. | 5 max. |
| Dextrose Equivalent (D.E.) | 10–13 | 9–13 |
| Average Bulk Density lbs./cu.ft. | 32–36 | 12–35 |
| pH | 4.5–5.5 | 4.5–5.5 |

Reference is now made to the accompanying drawing which illustrates a process in accordance with this invention for the manufacture of the tabletting sugar. As indicated in the accompanying drawing sugar syrup made up of a water solution of sucrose is supplied from tank 10 via line 11, pump 12 and line 13 to weigh tank 14. Malto-Dextrin from a suitable source is supplied via line 15 to tank 16 together with a suitable amount of water via line 18. Tank 16 is provided with agitator 19 to effect the dissolution of the malto-dextrin therein. The resulting water solution of malto-dextrin is supplied from tank 16 via line 20 together with a weighed amount of sugar syrup from weigh tank 14 via line 21 into feed tank 22 which is provided with agitator 23. The amount of sugar syrup, malto-dextrin and water supplied to feed tank 22 is desirably adjusted to provide therein a sugar syrup having a solids (sucrose and malto-dextrin) content of about 67.0 percent by weight solids, the malto-dextrin content of the solids being in the range 0.5–7.5 percent by weight, preferably an amount 1–3 percent by weight malto-dextrin.

The syrup is supplied from syrup feed tank 22 via line 24 and pump 25 to preheater 26 from which it is introduced via line 28 into vacuum concentrator 29, such as an RFC vacuum concentrator.

Vacuum concentrator 29 is operated at a temperature in the range 120°–130° C., preferably not higher than 130° C., so as to produce a concentrated syrup having a solids content in the range 91–97 percent by weight solids. A vacuum is provided within vacuum concentrator 29 by means of a barometric condenser, generally indicated by reference numeral 30, which is connected to vacuum concentrator 29 by vapor line 31.

Concentrated syrup flows from vacuum concentrator 29 via line 32 to vapor-liquid separator 34 which is connected to barometric condenser 30 via vapor lines 31a and 31. The resulting hot, concentrated syrup flows from vapor-liquid separator 34 via line 35 and is then supplied by pump 36 and line 38 into beater-crysallizer 39, such as a Turbulizer beater-crystallizer manufactured by Strong-Scott Mfg. Co., Minn., Minn. The operation of Turbulizer beater-crystallizer 39 to effect the rapid crystallization of the sugar, i.e., the sucrose, from the concentrated sugar syrup supplied thereto is described in U.S. Pat. No. 3,365,331 issued Jan. 23, 1968. The disclosures of this patent, particularly insofar as they relate to the practices of this invention for the preparation of a concentrated sugar syrup and the crystallization of sugar therefrom, including the operation of the Turbulizer beater-crystallizer in the practice of this invention, are herein incorporated and made part of this disclosure.

Within beater-crystallizer 39 the hot, concentrated syrup introduced thereinto via line 38 is subjected to violent impact beating by paddles 40. Upon entry into beater-crystallizer 39 the hot concentrated syrup is subjected to almost instantaneous crystallization with the production of fondant-size sucrose crystals having a crystal size in the range 3–50 microns. At the same time the malto-dextrin or hydrolyzed cereal solids content of the concentrates syrup introduced into beater-crystallizer 39 also is precipitated or crystallized with the result that the sucrose and the malto-dextrin are substantially cocrystallized and agglomerates or aggregates of fondant-size sucrose crystals uniformly admixed and/or coated with malto-dextrin are formed.

Air is introduced into beater-crystallizer 39 via line 41. Air, which may be supplied under pressure to beater-crystallizer 39 or which may pass through line 41 into beater-crystallizer 39 by induction thereto when beater-crystallizer 39 is in operation, sweeps through beater-crystallizer 39 and carries with it and removes therefrom any vapors released by the cocrystallization or precipitation of the sucrose and malto-dextrin. The air thus supplied to beater-crystallizer 39 serves not only to sweep and carry away the water vapors during crystallization within beater-crystallizer 39 but also serves to have a cooling effect upon the materials within beater-crystallizer 39 and helps to prevent any increase in temperature of the materials therein due to the heat of crystallization of the sucrose as it crystallizes from the concentrated syrup within beater-crystallizer 39. Satisfactory results are obtained in the operation of beater-crystallizer 39 with a residence time for the sugar introduced thereinto in the range from about 10 seconds to about 60–120 seconds, also with airflow rates through beater-crystallizer 39 in the range from about 9 cubic feet per minute per pound of sugar product issuing therefrom to about 20–40 cubic feet per minute per pound of sugar product per minute. If desired, the air passing through beater-crystallizer 39 may be separately vented, by means not shown, or may pass together with the resulting agglomerates of fondant-size sucrose crystals together with cocrystallized or coprecipitated malto-dextrin via line 42 into dryer 44.

Within dryer 44 hot air is supplied via line 45 and is exhausted from dryer 44 via line 46. The agglomerates of fondant-size sucrose crystals supplied to dryer 44 have a moisture content in the range 2–3 percent by weight and upon leaving dryer 44 via line 47 the moisture content is reduced to a value below about 1.0 percent, such as a value below about 0.5 percent by weight moisture.

The resulting dried aggregates of fondant-size sucrose crystals are then supplied via line 47 to cooler 48 where they are reduced in temperature to about room temperature and then supplied via line 49 to scalper 50 which serves to remove those agglomerates having an undesirable particle size. Those agglomerates having a suitable particle size are supplied from scalper 50 via line 51 to mill 52 where the agglomerates are ground to a desired smaller particle size. The resulting ground agglomerates are then passed from mill 52 via line 54 to screen 55 which serves to segregate or pass through those agglomerates having the desired particle size, e.g., smaller than 35 Tyler mesh, which are then passed via line 56 to product bin 57 for subsequent handling and packaging. The oversized agglomerates are passed from screen 55 via line 58 to collector 59 from which they are passed via line 60 to elevator 61 and line 62 for recycle to mill 52.

In accompanying Table No. 2 are listed analytical date of a number of batches of tabletting sugar prepared in accordance with this invention and consisting essentially of 98 percent by weight sucrose and 2 percent by weight malto-dextrin (Total solids basis).

TABLE NO. 2

| Batch number | 1 | 2 | 3 | 4 | 5 |
|---|---|---|---|---|---|
| Analytical data: | | | | | |
| Percent reducing sugars (dry wt.) | 0.38 | 0.38 | 0.39 | 0.37 | 0.38 |
| Percent water | 0.25 | 0.24 | 0.35 | 0.27 | 0.24 |
| pH | 7.45 | 7.50 | 7.50 | 7.55 | 7.35 |
| Bulk density (lbs./cu. ft.) | 37.85 | 36.55 | 37.45 | 36.65 | 39.45 |
| Angle of repose | 27°6′ | 26°34′ | 27°3′ | 28°4′ | 27°31′ |
| Screen analysis on mesh Tyler: | | | | | |
| 35 | 0.00 | 0.00 | 0.00 | 0.00 | 0.00 |
| 48 | 0.00 | 0.00 | 0.00 | 0.00 | 0.00 |
| 65 | 3.97 | 4.24 | 1.66 | 1.58 | 21.43 |
| 100 | 19.66 | 23.25 | 13.80 | 13.30 | 22.20 |
| 200 | 58.10 | 34.98 | 35.13 | 35.67 | 19.51 |
| Pan | 18.27 | 37.53 | 49.41 | 49.45 | 36.86 |

The following are some formulations for the manufacture of sugar-containing tablets by direct compaction wherein the sugar is a tabletting sugar in accordance with this invention.

Ascorbic Acid Tablets Formulation I

| | |
|---|---|
| Ascorbic Acid, U.S.P. | 5.5 lb. |
| Tabletting Sugar | 6.35 lb. |
| Calcium Stearate (tabletting or die lubricant) | 0.15 lb. |

Dicalcium Phosphate with Vitamin D Formulation II

| | |
|---|---|
| Dicalcium Phosphate, U.S.P. | 10.4 lb. |
| Activated Ergosterol in Oil | 0.005 lb. |
| Sodium Chloride, U.S.P. | 0.0137 lb. |
| Tabletting Sugar | 7.6 lb. |
| Vanillin, U.S.P. | 0.04 lb. |
| Calcium Stearate | 0.15 lb. |

Colored and Flavored Tablets Formulation III

| | |
|---|---|
| Imitation Strawberry Flavor | 0.5 lb. |
| Approved Certified Color | 0.3 lb. |
| Tabletting Sugar | 97.7 lb. |
| Calcium Stearate | 1.5 lb. |

By way of example, a typical particle size screen analysis of a tabletting sugar prepared in accordance with this invention is as follows:

| | |
|---|---|
| On 35 Tyler | 0.1% |
| On 48 Tyler | 14.5% |
| On 100 Tyler | 38.5% |
| On 200 Tyler | 25.0% |
| On Pan | 21.9% |

Indicative of the superiority of a sugar-containing tablet prepared from a tabletting sugar in accordance with this invention, a tablet prepared in accordance with this invention and containing about 2.0 percent by weight malto-dextrin measured 19.75 hardness units whereas a physical blend of aggregates of fondant-size sucrose crystals and malto-dextrin in the same proportions prepared by physically admixing malto-dextrin with the fondant-size sucrose crystals gave a tablet which had a hardness of only 9.6 hardness units.

Also, a sugar-containing table was prepared from aggregates of fondant-size sucrose crystals uniformly admixed with 5 percent invert sugars, such as a sugar which might be prepared in accordance with the practices of U.S. Pat. No. 3,365,331. Tablets prepared from such a sugar, although having substantially the same hardness as a tablet prepared from a tabletting sugar manufactured in accordance with this invention, were extremely hygroscopic and tablets prepared from such a tabletting sugar were therefore commercially undesirable.

As will be apparent to those skilled in the art in the light of the foregoing disclosure, many modifications, alterations and substitutions are possible in the practice of this invention without departing from the spirit or scope thereof.

We claim:

1. A method of producing a stable, substantially nonhygroscopic, sugar-containing tablet which comprises forming by direct compaction into a desired shape a free-flowing sugar composition consisting essentially of finely divided, smaller than 35 Tyler mesh, agglomerates of fondant-size sucrose crystals having a crystal size in the range 3–50 microns, said sucrose crystals being uniformly admixed or coated with malto-dextrin, said sugar composition having a moisture content not greater than about 1 percent by weight and said malto-dextrin having been cocrystallized with said sucrose crystals and having dextrose equivalent value below about 19 and being present in said composition in an amount in the range from about 0.5 to about 7.5 percent by weight based on the sucrose content of said composition.

2. A method in accordance with claim 1 wherein the sucrose content of said composition is about 98 percent by weight and the malto-dextrin content is about 2 percent by weight, said percents by weight being based on the total solids contained in said composition.

3. A tabletted sugar-containing product produced in accordance with the method of claim 1.

* * * * *